United States Patent
Kim

(10) Patent No.: US 10,252,708 B2
(45) Date of Patent: Apr. 9, 2019

(54) REMOTE STARTUP CONTROL DEVICE AND METHOD IN CONSIDERATION OF OPERATIONAL STATE OF PARKING BRAKE

(71) Applicant: Hyundai Motor Company, Seoul (KR)

(72) Inventor: Jin Gi Kim, Jeonju-si (KR)

(73) Assignee: Hyundai Motor Company, Seoul (KR)

( * ) Notice: Subject to any disclaimer, the term of this patent is extended or adjusted under 35 U.S.C. 154(b) by 156 days.

(21) Appl. No.: 15/383,888

(22) Filed: Dec. 19, 2016

(65) Prior Publication Data
US 2018/0111596 A1  Apr. 26, 2018

(30) Foreign Application Priority Data

Oct. 24, 2016  (KR) .................. 10-2016-0138628

(51) Int. Cl.
| | | |
|---|---|---|
| *B60T 17/22* | (2006.01) | |
| *B60T 13/26* | (2006.01) | |
| *B60T 7/16* | (2006.01) | |
| *F02N 11/08* | (2006.01) | |
| *F02N 11/10* | (2006.01) | |
| *B60T 7/08* | (2006.01) | |

(52) U.S. Cl.
CPC ............ *B60T 17/22* (2013.01); *B60T 7/085* (2013.01); *B60T 7/16* (2013.01); *B60T 13/26* (2013.01); *F02N 11/0807* (2013.01); *F02N 11/101* (2013.01); *F02N 11/103* (2013.01); *F02N 11/0811* (2013.01); *F02N 11/10* (2013.01)

(58) Field of Classification Search
None
See application file for complete search history.

(56) References Cited

U.S. PATENT DOCUMENTS

| | | | | |
|---|---|---|---|---|
| 5,614,883 | A * | 3/1997 | Dery | F02N 11/10 180/287 |
| 7,532,959 | B2 * | 5/2009 | Ochs | B60R 25/045 123/179.2 |
| 2016/0332498 | A1* | 11/2016 | Lindsay | B60T 13/662 |
| 2017/0174197 | A1* | 6/2017 | Eberling | B60T 7/20 |
| 2018/0029488 | A1* | 2/2018 | Sjodin | B60L 11/1838 |

FOREIGN PATENT DOCUMENTS

| | | |
|---|---|---|
| JP | 2006-248471 A | 9/2008 |
| KR | 10-2002-0044764 A | 6/2002 |
| KR | 10-0513486 B1 | 9/2005 |
| KR | 20040054029 * | 9/2005 |
| KR | 1020160056714 | 5/2016 |

* cited by examiner

*Primary Examiner* — Mussa A Shaawat
*Assistant Examiner* — Abdhesh K Jha
(74) *Attorney, Agent, or Firm* — Morgan, Lewis & Bockius LLP

(57) ABSTRACT

A remote startup control device and method in consideration of an operational state of a parking brake is disclosed. The remote startup control device includes an air processing device for supplying compressed air to a parking brake chamber, a relay valve for controlling an air line connecting the air processing device to the parking brake chamber, and a control unit for determining whether to permit remote startup based on whether an input switch and an output switch of the relay valve are in an activated state.

20 Claims, 6 Drawing Sheets

REMOTE STARTUP CONTROL DEVICE AND METHOD IN CONSIDERATION OF OPERATIONAL STATE OF PARKING BRAKE

The present application claims priority to Korean Patent Application No. 10-2016-0138628, filed on Oct. 24, 2016, the entire contents of which is incorporated herein for all purposes by this reference.

BACKGROUND OF THE INVENTION

Field of the Invention

The present invention relates to remote vehicle startup, and more particularly, to a remote startup control device and method in consideration of conditions for permitting remote startup.

Discussion of the Related Art

Currently, more and more vehicles are being equipped with a telematics system, which is a wireless communication technology for vehicles. Telematics is an essential technology for autonomous driving or safe driving, and utilizes wireless communication technology and sensors mounted to vehicles. Telematics is primarily applied to warning devices, which provide the vehicle user with a warning or notification of a dangerous or potentially dangerous situation associated with, for example, vehicle security, a vehicle state, an external traffic light system, the distance to an obstacle, an impending collision, etc. Further, telematics includes technology for controlling the state of the vehicle, for example, remote monitoring, vehicle tracking, etc., based on a communication network.

Most vehicle owners or drivers (users) possess portable wireless communication devices (for example, mobile phones), and can check the state of the units to which telematics is applied and control the functions of the units using their portable wireless communication devices.

One such telematics technology utilizing a portable wireless communication device functions to enable a driver to control remote vehicle startup using his/her portable wireless communication device. Of course, even in the case of a vehicle that is not equipped with a telematics system, a driver can control remote vehicle startup using a smart key at close range. Further, a driver can control either the state in which electric power is supplied to electronic accessories in the vehicle (ACC mode) or the state in which all electronic systems are activated (ON/IGN mode) using his/her portable wireless communication device or smart key.

In the case of general cars equipped with automatic transmissions, it is possible to perform remote startup when the shift lever is located in a P-range (Parking range). However, since heavy vehicles or commercial vehicles (for example, buses, heavy trucks, etc.) are mostly equipped with manual transmissions, the conditions for permitting remote startup are different from those of general cars.

Since heavy vehicles or commercial vehicles, which are mostly used to transport passengers or freight, are larger than general cars, remote startup, which is performed in the state in which a driver is not in the vehicle, must be carried out under very strict conditions in order to ensure safety. Further, regardless of the type of vehicles as described above, there is a need for a method of controlling remote startup based on remote startup conditions capable of ensuring safety with respect to vehicles that are equipped with manual transmissions and full air brake systems.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a remote startup control device and method in consideration of an operational state of a parking brake that substantially obviates one or more problems due to limitations and disadvantages of the related art.

Various aspects of the present invention are directed to providing a remote startup control device and method in consideration of an operational state of a parking brake, which is capable of preventing misjudgment of conditions for permitting remote startup, which may be caused when air leaks from a brake that is operated using the pressure of compressed air.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure pointed out in the written description and claims hereof as well as the appended drawings.

In various aspects of the present invention, a remote startup control device includes an air processing unit for supplying compressed air to a parking brake chamber, a relay valve for controlling an air line connecting the air processing unit to the parking brake chamber, and a control unit for determining whether to permit remote startup based on whether an input switch and an output switch of the relay valve are in an activated state.

The remote startup control device may further include a parking brake lever for controlling the relay valve. The control unit may determine a state of the parking brake lever based on whether the input switch and the output switch are in an activated state, and when the parking brake lever is in an activated state, the control unit may permit remote startup.

The remote startup control device may further include a monitoring unit for monitoring a pressure of the input switch and a pressure of the output switch. When the pressure of the output switch is equal to or lower than a first pressure, the control unit may determine that the output switch is in an activated state, and when the pressure of the input switch is equal to or higher than a second pressure, the control unit may determine that the input switch is in an activated state.

When the input switch is in an activated state and the output switch is in an activated state, the control unit may determine that the parking brake lever is in an activated state.

When an internal pressure in the parking brake chamber is lower than a threshold value, a braking force of the parking brake may be generated.

The air processing device may receive compressed air from an air compressor.

When a manual transmission is in a neutral state and the parking brake lever is in an activated state, the control unit may permit remote startup.

When the parking brake lever is in an activated state, the control unit may close the relay valve.

The first pressure may be higher than the second pressure.

When the parking brake lever is in an activated state, the control unit may permit remote startup after a predetermined time period has elapsed.

In another aspect of the present invention, a remote startup control method includes supplying compressed air from an air processing device to a parking brake chamber, controlling an air line, connecting the air processing device to the parking brake chamber, using a relay valve, and determining whether to permit remote startup based on whether an input switch and an output switch of the relay valve are in an activated state using a control unit.

The remote startup control method may further include controlling the relay valve using a parking brake lever.

The remote startup control method may further include determining a state of the parking brake lever based on whether the input switch and the output switch are in an activated state using the control device, and upon determining that the parking brake lever is in an activated state, permitting remote startup using the control device.

The remote startup control method may further include monitoring a pressure of the input switch and a pressure of the output switch using a monitoring device.

The remote startup control method may further include, upon determining that the pressure of the output switch is equal to or lower than a first pressure, determining that the output switch is in an activated state using the control unit, and upon determining that the pressure of the input switch is equal to or higher than a second pressure, determining that the input switch is in an activated state using the control unit.

The remote startup control method may further include, upon determining that the input switch is in an activated state and the output switch is in an activated state, determining that the parking brake lever is in an activated state using the control unit.

The remote startup control method may further include, when an internal pressure in the parking brake chamber is lower than a threshold value, generating a braking force of the parking brake.

The remote startup control method may further include supplying compressed air from an air compressor to the air processing device.

The remote startup control method may further include, when a manual transmission is in a neutral state and the parking brake lever is in an activated state, permitting remote startup using the control unit.

The remote startup control method may further include, when the parking brake lever is in an activated state, closing the relay valve using the control unit.

The first pressure may be higher than the second pressure.

The remote startup control method may further include, when the parking brake lever is in an activated state, permitting remote startup after a predetermined time period has elapsed using the control unit.

In a further aspect of the present invention, there is provided a computer-readable recording medium in which programs for implementing the above-described method are recorded.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
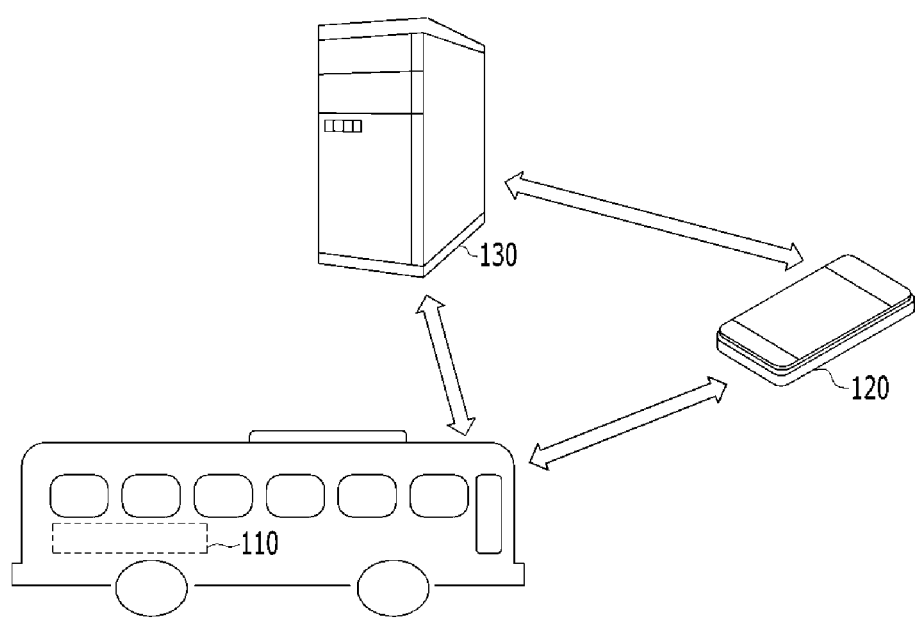
FIG. 1 is a view for explaining a system for controlling remote startup according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to the exemplary embodiments of the present invention, examples of which are illustrated in the accompanying drawings. The suffixes "module" and "unit" of elements herein are used for convenience of description and thus can be used interchangeably and do not have any distinguishable meanings or functions.

In the following description, although all of the components of the present invention may be explained as assembled or operatively connected as a device, the present invention is not intended to limit itself to such aspects. Rather, within the objective scope of the present invention, the respective components may be selectively and operatively combined in any number. Also, every one of the components may be implemented by itself in hardware, or the respective ones can be selectively combined in whole or in part and implemented as a computer program having program modules for executing functions of the hardware equivalents. Code or code segments for constituting such a program may be easily deduced by a person skilled in the art. The computer program may be stored in computer-readable media, which in operation can realize the aspects of the present invention. As the computer-readable media, candidates include magnetic recording media, optical recording media, and carrier wave media.

In the following description, it will be understood that, when each element is referred to as being formed "on", "under", "in front of" or "behind" the other element, it can be directly "on", "under", "in front of" or "behind" the other element, or can be indirectly formed with one or more intervening elements therebetween.

In addition, since terms such as "include", "comprise" and "have" mean that one or more corresponding components may exist unless specifically described to the contrary, it shall be construed that one or more other components can be included. All of the terminologies containing one or more technical or scientific terminologies have the same meanings that persons skilled in the art understand ordinarily unless they are defined otherwise. A term ordinarily used in the manner defined by a dictionary shall be construed to have a meaning equal to that in the context of the related description, and shall not be construed to have an ideal or excessively formal meaning unless it is clearly defined in the present specification.

Also, in describing the components of the present invention, there may be terms used like "first", "second", "A", "B", "(a)", and "(b)". These are solely for differentiating one component from another, but are not intended to imply or suggest the substances, order or sequence of the components. When a component is described as "connected", "coupled", or "linked" to another component, it may mean the component is not only directly connected, coupled, or linked, but may also mean that it is indirectly connected, coupled, or linked via a third component.

Further, in the following description of the present invention, a detailed description of known functions and configurations incorporated herein will be omitted when it may make the subject matter of the present invention rather unclear.

A remote startup system may be operated in conjunction with telematics technology utilizing a portable wireless communication device, and may also be operated in response to a remote startup control signal from a smart key at close range.

Since the remote startup system may be used before a driver gets in a vehicle, there is a need for strict conditions for permitting remote startup. Various remote startup conditions may be set depending on the state of the vehicle.

Desired conditions for permitting remote startup may not be satisfied, and consequently the remote startup operation may be restricted in situations where, for example, fuel is insufficient, the speed of a vehicle is not zero, an accelerator pedal is in a pressed state, a smart key is in the vehicle (Fob in Vehicle), a cab of a heavy truck is in a tilted state (Cab Tilting), a maintenance panel is in an open state (Frt Panel Open), a door is in an unlocked or open state (Door Unlocked or Open), a pusher axle of a lift axle vehicle is in a down state (Pusher Axle Down), a parking brake lever is in a released state, etc.

In the case where a shift lever is located in a P-range in general cars equipped with automatic transmissions, when the foregoing remote startup conditions are satisfied, it is possible to perform remote startup. However, heavy vehicles or commercial vehicles are mostly equipped with manual transmissions. In such heavy vehicles or commercial vehicles, it is possible to perform remote startup when the manual transmission is in a neutral state and the foregoing remote startup conditions are satisfied.

Remote startup of heavy vehicles or commercial vehicles must be performed under stricter safety conditions than in the case of general cars. In addition, the possibility of misjudging remote startup conditions has been found in a conventional failure mode and effect analysis (FMEA), which is used for safety analysis of the remote startup system. Accordingly, the present invention proposes a remote startup control device and method that is capable of preventing misjudgment of remote startup conditions.

Various embodiments of the present invention relates to a remote startup control method based on a determination of whether a parking brake lever is in a released state, among the foregoing remote startup conditions, more particularly, based on a determination of whether air is leaking in a vehicle equipped with a full air brake.

Hereinafter, the overall structure of a remote startup system according to an exemplary embodiment of the present invention will be explained with reference to FIG. 1 and FIG. 2, on the basis of which the problem with a conventional system will be reviewed. In addition, a remote startup control device and method utilizing a determination of whether air is leaking from a full air brake will be explained with reference to FIGS. 3 to 6.

FIG. 1 is a view for explaining a system for controlling remote startup according to an exemplary embodiment of the present invention.

Referring to FIG. 1, a remote startup control device 110, which is mounted to a vehicle, may be connected to a network server 130 using wireless communication technology, and may also be connected to a portable communication device 120 using wireless communication technology or local area communication technology.

The network server 130 is a network device that is operated to support telematics technology applied to a vehicle, and may store specific information about the vehicle, information about the operation of the vehicle, etc. The network server 130 may be operated in conjunction with the vehicle via the wireless communication network while the vehicle is travelling or before/after the vehicle travels. In addition, the network server 130 may store information set by the driver (user), and may help the driver (user) to manipulate devices or functions associated with travelling of the vehicle and safety. The network server 130 may be set such that it is possible to start the engine of the vehicle using the smart key or the portable communication device 120 and the network server 130, or may be set such that it is not possible to start the engine of the vehicle using the smart key or the portable communication device 120 when the driver (user) does not wish to enable the remote startup function.

The portable communication device 120 may be, for example, a smart phone, which the driver (user) can carry. The portable communication device 120 may be operated in conjunction with the vehicle or the network server 130 using wireless communication technology or local area communication technology, and may also store or obtain specific information about the vehicle or personal information about the driver.

Figure 2:
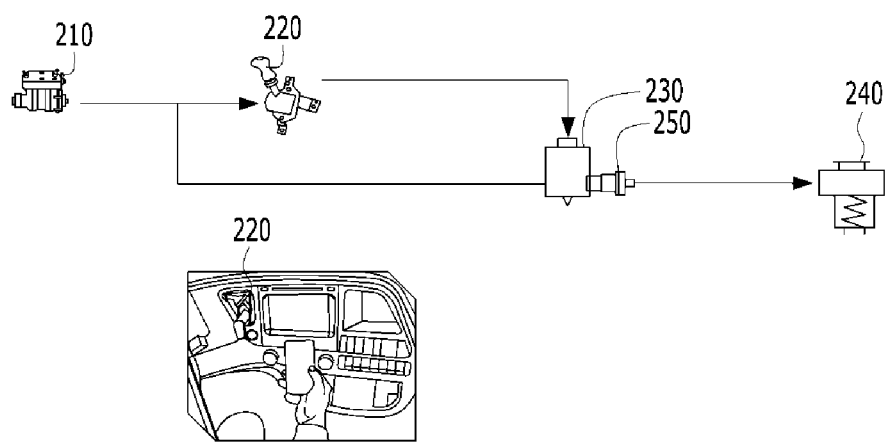
FIG. 2 is a constitutional view for explaining the operation of an air parking brake according to an exemplary embodiment of the present invention.

FIG. 2 is a constitutional view for explaining the operation of an air parking brake according to an exemplary embodiment of the present invention.

Referring to FIG. 2, the remote startup control device may include an air processing device (APU) 210, a parking brake lever 220, a relay valve 230, and a parking brake chamber 240. The components depicted in FIG. 2 are not essential, and the remote startup control device may be configured to include more or fewer components than those shown in FIG. 2.

The air processing device may be mostly mounted to a full air brake system. The air processing device may serve to supply compressed air, which is supplied from an air compressor, to a plurality of brake systems via a plurality of air lines.

The air processing device may include a pressure sensor and a pressure control valve, and may remove moisture from the compressed air that is supplied thereto. The air processing device may supply air having a pressure and humidity suitable for each of the plurality of brake systems.

The parking brake lever may be located in front of or beside the driver's seat, and the driver may control the activation of the parking brake by pulling or pushing the parking brake lever. The driver may normally move the parking brake lever to an activated position when parking the vehicle, but in some abnormal cases, may park the vehicle in the state in which he/she has left the parking brake lever in an inactivated position.

In an exemplary embodiment of the present invention, the parking brake may be a full air brake. The full air brake may be mostly used for heavy vehicles or commercial vehicles. Hereinafter, the process of operating the full air brake will be explained.

The air processing device may receive compressed air from the air compressor and may supply the compressed air to the parking brake lever and the parking brake chamber.

The relay valve may be disposed in the air line that is positioned between the air processing device and the parking brake chamber and may be configured to allow or shut off the flow of compressed air through the air line.

For example, when the relay valve is closed, the air cannot be supplied from the air processing device to the parking brake chamber. When the relay valve is open, the air can be supplied from the air processing device to the parking brake chamber.

The parking brake lever may be maintained in an activated state or an inactivated state depending on the driver's intention. The driver may control the state of activation of the parking brake by pushing or pulling the parking brake lever.

The parking brake lever may control the air line of the relay valve depending on the state thereof, that is, the activated state or the inactivated state, to allow or shut off the supply of compressed air to the parking brake chamber.

When the compressed air is supplied to the parking brake chamber, a spring is compressed against its spring force by the internal pressure in the parking brake chamber, countering the braking force of the parking brake. Conversely, when the supply of compressed air to the parking brake chamber is prevented, the internal pressure in the parking brake chamber becomes weaker than the spring force, and the spring force is applied to the parking brake chamber, generating the braking force of the parking brake.

That is, the parking brake lever may control the internal pressure in the parking brake chamber depending on the activated state or the inactivated state thereof, and the braking force may be generated or eliminated depending on the internal pressure in the parking brake chamber.

Described in detail, when the driver moves the parking brake lever to an activated position, the relay valve is closed, and the internal pressure in the parking brake chamber cannot overcome the spring force, whereby the braking force of the parking brake is generated. Conversely, when the driver moves the parking brake lever to an inactivated position, the relay valve is opened, and the internal pressure in the parking brake chamber overcomes the spring force, whereby the braking force of the parking brake is eliminated.

Remote startup may be permitted when the vehicle is in a parked state, that is, in the state in which braking force is present, and cannot be permitted in the state in which the braking force is eliminated. When there is no braking force in the situation where the vehicle cannot be controlled during the driver's absence, an accident may occur.

In general, a remote startup system does not determine whether the vehicle is in a parked state based on whether the parking brake lever is in an activated state or an inactivated state, but determines whether the vehicle is in a parked state based on the state of an output switch 250 mounted to the relay valve 230.

The output switch mounted to the relay valve is disposed in the air line that is connected to the parking brake chamber. When the pressure of the air that is supplied to the parking brake chamber is less than a pressure (for example, 5.5 bar) capable of overcoming the spring force of the parking brake chamber, it is determined that the parking brake is in an activated state.

Whether the braking force is present may be determined based on the pressure of the air in the parking brake chamber. That is, whether the braking force is applied to the parked vehicle may be determined based on whether the output switch, which is disposed in the air line connected to the parking brake chamber, is in an activated state or an inactivated state.

When the output switch is in an activated state, the remote startup system determines that the vehicle is in a parked state, and performs the remote startup operation in response to a remote startup signal from the portable wireless communication device or the smart key.

Meanwhile, when the vehicle is parked for a long time period, air may leak from valves, air tube connection portions or the parking brake chamber in the parking brake system. Air may also leak from the parking brake system when the driver presses the brake pedal several times while the vehicle stops or in a specific vehicle maintenance situation.

When the driver gets out of the vehicle when the parking brake lever is in an inactivated state and air leaks, a problem may occur.

In general, when the parking brake lever is in an inactivated state, the internal pressure in the parking brake chamber is high to overcome the spring force, whereby the braking force is countered.

However, when the pressure of the air supplied to the parking brake chamber is decreased below a value required to overcome the spring force in the parking brake chamber due to air leakage, and it is consequently determined that the output switch is in an activated state, the remote startup system determines that the vehicle is in a parked state and performs the remote startup operation.

As the result of the remote startup operation, the air processing device may be operated by cranking the engine, and compressed air may be supplied to the parking brake chamber when the parking brake lever is in an inactivated state. Accordingly, the internal pressure in the parking brake chamber is increased above a value required to overcome the spring force, and consequently the braking force is countered, which leads to an accident due to undesired movement of the vehicle. When the vehicle is on an incline, there is a risk of a major accident.

Therefore, according to an exemplary embodiment of the present invention, the determination of whether air is leaking from the air parking brake is included in the remote startup conditions, and a method of determining whether air is leaking will now be explained with reference to FIG. 3.

Figure 3:
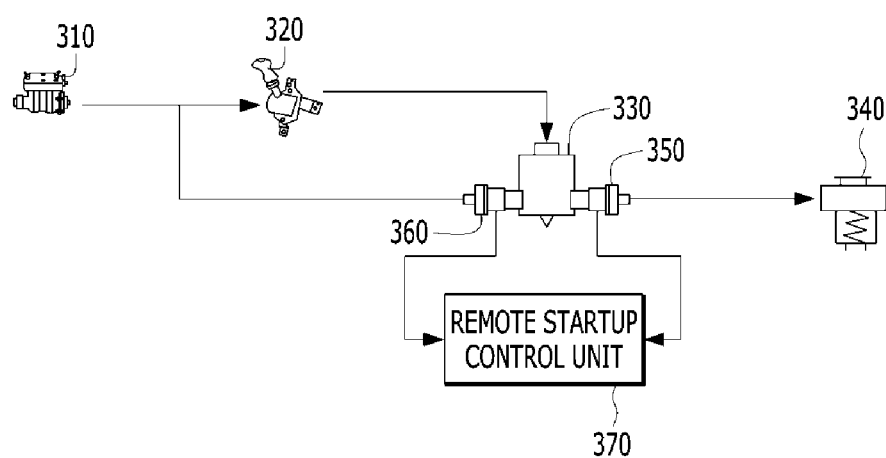
FIG. 3 is a constitutional view for explaining a method of determining whether air is leaking from the air parking brake according to an exemplary embodiment of the present invention.

FIG. 3 is a constitutional view for explaining a method of determining whether air is leaking from the air parking brake according to an exemplary embodiment of the present invention.

Referring to FIG. 3, the remote startup system includes a relay valve 330, to which an input switch 360 and an output switch 350 are mounted. The input switch 360 may be additionally mounted to the relay valve 230 in FIG. 2.

The input switch 360 may perform an operation similar to that of the output switch 350. The input switch 360 may be disposed in the air line that extends from the air processing device 310 to the relay valve 330. In other words, the input switch 360 may be located in the path through which air flows toward the relay valve 330.

Like the operation of the output switch 350, the input switch 360 monitors the pressure of the air that flows to the relay valve 330 through the air line. When the monitored pressure of the air is equal to or higher than a predetermined second pressure, it is determined that the output switch 350 is in an activated state.

Due to the structural characteristics of a pneumatic circuit, the pressure of the air in the air line running from the air processor device to the relay valve 330 may have substantially the same value as the pressure of the air in the air line running to the parking brake lever 320, within some margin of error.

Therefore, when the pressure of the air in the air line running to the relay valve 330 (the pressure of the air in the input switch 360) is greater than the value required to overcome the spring force in the parking brake chamber 340, it is determined that air is not leaking from the air brake system.

When there is no air leakage from the air brake system, a determination of whether the parking brake lever 320 is in an activated state may be accurately made by determining the parked state of the vehicle based on a determination of whether the output switch 350 is in an activated state. As a result, it is possible to trust the result of the determination of the parked state of the vehicle, which is derived from the determination of whether the output switch 350 is in an activated state.

In other words, when a remote startup control unit 370 detects the activated state of the input switch 360, the determination of whether the output switch 350 is in an activated state is reliable.

Based on this reliability, the remote startup control unit 370 may determine that air is not leaking from the parking brake system, and may determine that the braking force is applied to the parked vehicle based on the determination of the activated state of the output switch 350. Upon determining that the output switch 350 is in an inactivated state, the remote startup control unit 370 may determine that the parking brake lever 320 is in an inactivated state. As a result, the remote startup control unit 370 may detect that the vehicle is not in a parked state, and may not allow the remote startup operation.

Conversely, upon determining that the input switch 360 is in an inactivated state, the remote startup control unit 370 determines that air is leaking from the parking brake system. In the instant case, even though the remote startup control unit 370 determines that the output switch 350 is in an activated state, it detects that the vehicle is in an abnormally parked state, and does not allow the remote startup operation.

The second pressure, on the basis of which whether the input switch 360 is in an activated state or an inactivated state is determined, may be set to be larger than the first pressure, on the basis of which whether the output switch 350 is in an activated state is determined, in consideration of the manufacturing tolerance of a pneumatic pressure switch (for example, 0.45 Bar).

Figure 4:
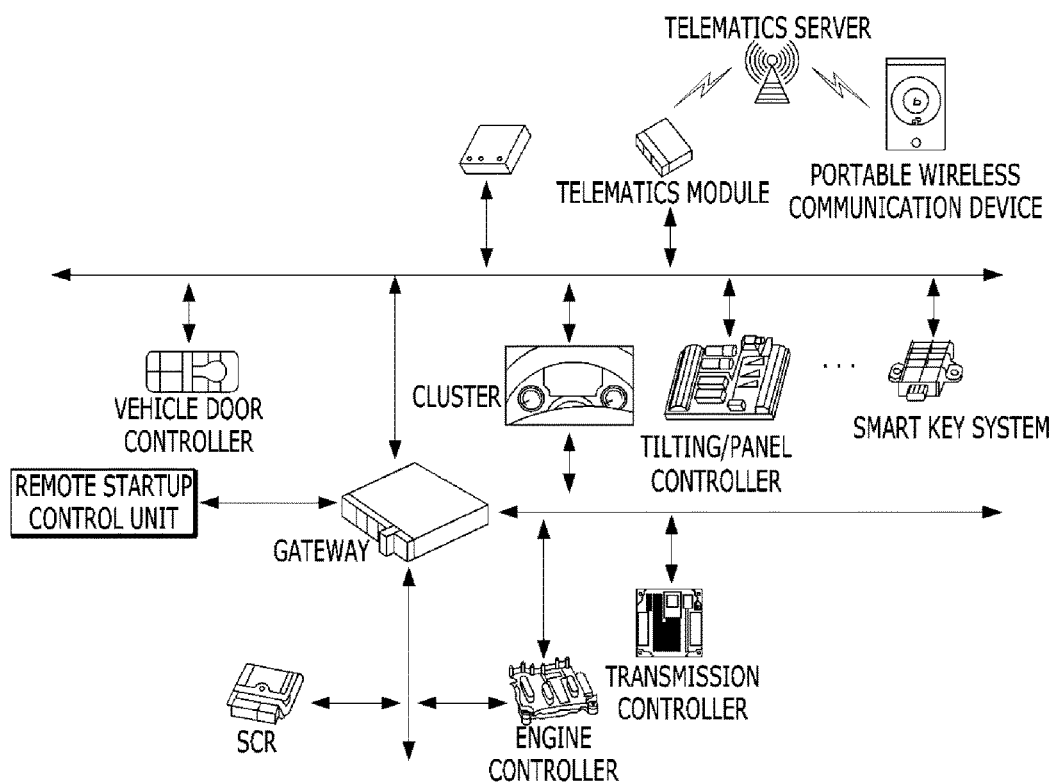
FIG. 4 is a constitutional view for explaining a remote startup control system according to an exemplary embodiment of the present invention.

FIG. 4 is a constitutional view for explaining the remote startup control system according to an exemplary embodiment of the present invention.

Referring to FIG. 4, the present invention may perform the remote startup control using telematics utilizing a portable wireless communication device. Without being limited to the portable wireless communication device, the present invention may also perform the remote startup operation in response to a remote startup signal from a smart key other than the portable wireless communication device.

The driver may control the remote startup control system utilizing the portable wireless communication device (or the smart key).

When the portable wireless communication device transmits a remote startup request signal to the telematics server, the telematics module mounted to the vehicle may receive the remote startup request signal from the telematics server.

The telematics module may transmit the remote startup request signal to the remote startup control unit via an air-conditioning controller or a CAN bus.

The air-conditioning controller may receive the remote startup request signal and may operate an air conditioner or a heater to control the internal temperature in the vehicle. The remote startup request signal may include information about a predetermined internal temperature in the vehicle.

The remote startup control unit may receive the remote startup request signal and may determine whether to permit the remote startup. The remote startup control unit may collect information about the state of the vehicle from controllers for a variety of electronic components through a vehicle communication system. The respective controllers may generate state information based on data input through wires, or may transmit existing state information to the remote startup control unit through CAN communication. According to one embodiment, the remote startup control unit may be included in a smart key system.

For example, a cluster may transmit information about the remaining amount of fuel and a vehicle speed, a tilting/panel controller may transmit information about whether a cab is in a tilted state and about whether a maintenance panel is in an open state, a vehicle door controller may transmit information about whether a vehicle door is in an open state or an unlocked state, and a transmission controller may transmit information about whether a shift lever is located in a neutral position to the remote startup control device.

The remote startup control unit may determine whether to permit remote startup based on the information about the state of the vehicle that the remote startup control unit receives from the controllers for the respective electronic components.

According to an exemplary embodiment of the present invention, when determining whether to permit remote startup based on the information about the state of the vehicle, the remote startup control unit may additionally include a result of a determination of whether air is leaking from the full air brake in the conditions for permitting remote startup.

To reduce misjudgment of the parked state of the vehicle due to air leakage from the full air brake, the remote startup control unit may determine whether the input switch of the relay valve is in an activated state. The input switch may monitor the pressure of the air that is supplied to the relay valve. When the monitored pressure of the air is equal to or higher than the reference value, it may be determined that the input switch is in an activated state.

When the conditions for permitting remote startup are satisfied, the remote startup control unit may transmit a remote startup command signal to an engine controller via a gateway of the CAN communication. When the engine controller receives the remote startup command signal, it activates the engine, starting the engine.

Figure 5:
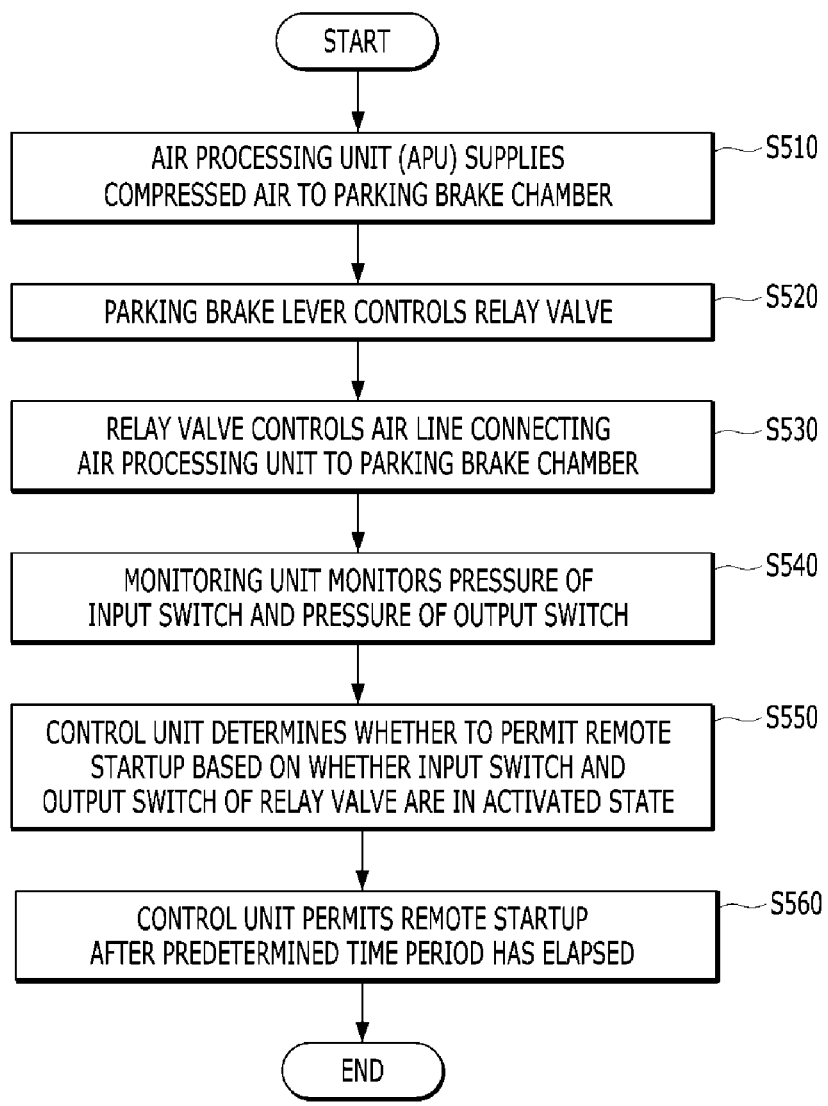
FIG. 5 is a flowchart for explaining a remote startup control method according to an exemplary embodiment of the present invention.

FIG. 5 is a flowchart performed by a controller and for explaining a remote startup control method according to an exemplary embodiment of the present invention.

Referring to FIG. 5, the air processing device may receive compressed air from the air compressor. The air processing device may supply compressed air to a plurality of brake systems other than the full air brake system.

The air processing device may supply air having a predetermined pressure (for example, 7.7 Bar) to the full air brake system. The air processing device may supply compressed air to the parking brake lever and the parking brake chamber (S510).

The relay valve may be disposed in the air line, through which the air processing device supplies air to the parking brake chamber. The relay valve may allow or shut off the supply of compressed air to the parking brake chamber by controlling the air line.

The relay valve may control the supply of air to the parking brake chamber by being closed or opened by the parking brake lever (S520 and S530).

The remote startup control unit may monitor the state of the input switch, which is positioned in a connection portion through which air flows from the air processing device to the relay valve, and the state of the output switch, which is positioned in a connection portion through which air flows from the relay valve to the parking brake chamber (S540).

When the pressure of the air in the portion in which the input switch is positioned is equal to or higher than the predetermined pressure (the second pressure), the remote startup control unit may determine that the input switch is in an activated state. When the pressure of the air in the portion in which the output switch is positioned is equal to or lower than the predetermined pressure (the first pressure), the remote startup control unit may determine that the output switch is in an activated state. The input switch and the output switch may function as pressure sensors, and may monitor the pressure of the air in the portions at which they are mounted to the relay valve. The input switch and the output switch may transmit the monitored information about air pressure or the information about whether they are in an activated state or an inactivated state to the remote startup control device.

The remote startup control unit may determine whether to permit remote startup based on whether the input switch and the output switch, which are mounted to the relay valve, are in an activated state (S550).

Upon determining that the input switch is in an activated state, the remote startup control unit determines that air is not leaking from the full air brake. Subsequently, the remote startup control unit may determine whether the vehicle is in a parked state based on whether the output switch is in an activated state.

After a predetermined time period has elapsed, the remote startup control unit may transmit a remote startup command signal to the engine controller (S560). The predetermined time period may be set variously depending on the engine idling time or the temperature in the inside of the vehicle.

Engine idling is the condition when the engine is running but power transmission is not taking place. That is, when the engine has been started and is running at a low speed (i.e., a speed lower than a predetermined speed), the vehicle is not accelerated. The idling time may be variously set in consideration of reduction of fuel consumption and environmental protection.

Figure 6:
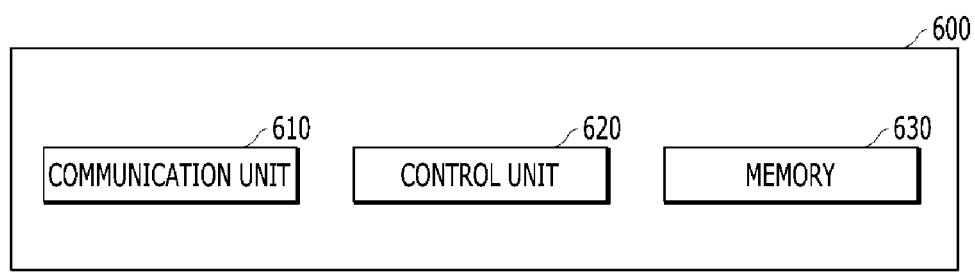
FIG. 6 is a view for explaining a remote startup control device according to an exemplary embodiment of the present invention.

FIG. 6 is a view for explaining the remote startup control device according to an exemplary embodiment of the present invention.

Referring to FIG. 6, a remote startup control device 600 may include a communication device 610, a control unit 620 and a memory 630.

The components depicted in FIG. 6 are not essential, and the remote startup control device 600 may be configured to include more or fewer components than those shown in FIG. 6.

The communication device 610 may receive state information and may transmit and receive command signals for performing remote startup to/from the controllers for a variety of electronic components in the vehicle through the vehicle communication system.

The control unit 620 may perform data processing and determination to control the remote startup control device 600. The control unit 620 may determine whether the remote startup conditions are satisfied based on the state information about the electronic components in the vehicle and on whether air is leaking from the full air brake.

The memory 630 is a data storage space and/or a data storage region in which predetermined program code, for controlling the overall operation of the remote startup control device 600, and data, which are input and output when the operation is performed using the program code, are stored, and may be embodied as an electrically erasable and programmable read only memory (EEPROM), a flash memory (FM), a hard disk drive or the like.

The method according to the above-described embodiment may be realized as programs for implementation on a computer, and may be stored in a recording medium that can be read by the computer. Examples of the computer-readable recording medium include a ROM, a RAM, a CD-ROM, a magnetic tape, a floppy disk, an optical data storage device, and so on. The computer-readable recording medium may also be implemented in a form of carrier waves (e.g., transmission via the Internet).

In addition, the computer-readable recording medium may be distributed to computer systems connected via a network, in which computer-readable code may be stored and executed in a distributed manner. Furthermore, functional programs, code, and code segments for implementing the above-described method may be easily deduced by programmers skilled in the art thereof.

As is apparent from the above description, the remote startup control device and method in consideration of an operational state of a parking brake according to an exemplary embodiment of the present invention have the following effects.

First, the driver is capable of performing remote startup to operate the air-conditioning system in a cold or hot season before getting in the vehicle, controlling the internal temperature in the vehicle.

Second, in the situation where compressed air leaks from the air brake, compressed air required to release the air brake is supplied to the air brake when the user performs remote startup before getting in the vehicle, reducing the amount of time taken to release the air brake, which may be delayed by air leakage.

Third, engine idling is performed through remote startup before the vehicle starts to run, reducing noise, vibration and harshness of the engine, which may occur in an early stage of operation.

Fourth, the engine idling time may be shortened by setting the remote startup control time.

Fifth, the driver's or user's safety may be improved by permitting remote startup under stricter conditions.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A remote startup control device comprising:
an air processing device for supplying compressed air to a parking brake chamber;
a relay valve for controlling an air line connecting the air processing device to the parking brake chamber; and
a control unit for determining whether to permit remote startup based on whether an input switch and an output switch of the relay valve are in an activated state,
wherein the activated state of the input switch and the output switch in the relay valve is determined based on an air pressure detected by the input switch in the relay valve and an air pressure detected by the output switch in the relay valve.

2. The remote startup control device according to claim 1, further including:
a parking brake lever for controlling the relay valve,
wherein the control unit is configured to determine a state of the parking brake lever based on whether the input switch and the output switch are in the activated state, and
when the parking brake lever is in an activated state, the control unit permits the remote startup.

3. The remote startup control device according to claim 2, further including:
a monitoring device configured for monitoring a pressure of the input switch and a pressure of the output switch,
wherein, when the pressure of the output switch is equal to or lower than a first pressure, the control unit is configured to determine that the output switch is in the activated state, and when the pressure of the input switch is equal to or higher than a second pressure, the control unit is configured to determine that the input switch is in the activated state.

4. The remote startup control device according to claim 3, wherein, when the input switch is in the activated state and the output switch is in the activated state, the control unit is configured to determine that the parking brake is the activated state.

5. The remote startup control device according to claim 1, wherein, when an internal pressure in the parking brake chamber is lower than a predetermined value, a braking force of the parking brake is generated.

6. The remote startup control device according to claim 2, wherein, when a manual transmission is in a neutral state and the parking brake lever is in the activated state, the control unit permits the remote startup.

7. The remote startup control device according to claim 2, wherein, when the parking brake is the activated state, the control unit closes the relay valve.

8. The remote startup control device according to claim 3, wherein the second pressure is higher than the first pressure.

9. The remote startup control device according to claim 3, wherein, when the parking brake is the activated state, the control unit permits the remote startup after a predetermined time period has elapsed.

10. A remote startup control method comprising:
supplying compressed air from an air processing device to a parking brake chamber;
controlling an air line, connecting the air processing device to the parking brake chamber, using a relay valve; and
determining whether to permit remote startup based on whether an input switch and an output switch of the relay valve are in an activated state using a control device,
wherein the activated state of the input switch and the output switch in the relay valve is determined based on an air pressure detected by the input switch in the relay valve and an air pressure detected by the output switch in the relay valve.

11. The remote startup control method according to claim 10, further including:
controlling the relay valve using a parking brake lever.

12. The remote startup control method according to claim 11, further including:
determining a state of the parking brake lever based on whether the input switch and the output switch are in the activated state using the control device; and
upon determining that the parking lever is in an activated state, permitting remote startup using the control device.

13. The remote startup control method according to claim 12, further including:
monitoring a pressure of the input switch and a pressure of the output switch using a monitoring device.

14. The remote startup control method according to claim 13, further including:
upon determining that the pressure of the output switch is equal to or lower than a first pressure, determining that the output switch is in the activated state using the control device; and
upon determining that the pressure of the input switch is equal to or higher than a second pressure, determining that the input switch is in the activated state using the control device.

15. The remote startup control method according to claim 14, further including:
upon determining that the input switch is in the activated state and the output switch is in the activated state, determining that the parking brake is the activated state using the control device.

16. The remote startup control method according to claim 10, further including:
when an internal pressure in the parking brake chamber is lower than a predetermined value, generating a braking force of the parking brake.

17. The remote startup control method according to claim 12, further including:
when a manual transmission is in a neutral state and the parking brake is the activated state, permitting the remote startup using the control device.

18. The remote startup control method according to claim 12, further including:
when the parking brake is the activated state, closing the relay valve using the control device.

19. The remote startup control method according to claim 14, wherein the second pressure is higher than the first pressure.

20. The remote startup control method according to claim 12, further including:

when the parking brake is the activated state, permitting the remote startup after a predetermined time period has elapsed using the control device.

\* \* \* \* \*